April 20, 1926.

D. E. WILLIAMS

NUT

Filed Jan. 26, 1925

1,581,559

INVENTOR.
David E. Williams
BY M. C. Frank
ATTORNEY.

Patented Apr. 20, 1926.

1,581,559

UNITED STATES PATENT OFFICE.

DAVID E. WILLIAMS, OF OAKLAND, CALIFORNIA, ASSIGNOR OF ONE-THIRD TO EIRVEN E. WILLIAMS, OF TRANQUILLITY, CALIFORNIA, AND ONE-THIRD TO BILLY MO., OF OAKLAND, CALIFORNIA.

NUT.

Application filed January 26, 1925. Serial No. 4,766.

*To all whom it may concern:*

Be it known that I, DAVID E. WILLIAMS, a citizen of the United States, residing at Oakland, in the county of Alameda and State of California, have invented certain new and useful Improvements in Nuts, of which the following is a specification.

This invention relates broadly to nuts, and more particularly to one-piece lock nuts whose functions are to prevent bolts and nuts from working loose under all conditions of service.

An important object of the invention is the production of a simple nut having all the properties of the common standardized nut of today, with the added feature of having as an integral part thereof a locking device for holding the nut permanently in place when jammed to final holding position.

Another object is that the locking device shall be in the nature of a washer spirally formed on the face of the nut as a spring tongue, and for very small nuts one tongue may suffice, but for the general run of nuts I prefer two tongues and for very large nuts three or more tongues.

A further object is that the face or contact side of the roots of all the tongues shall lie in the same plane, and which plane shall be at right angles to the axis of the nut, as this insures uniform stress throughout the body of the nut when the latter is screwed home.

A still further object is, in cases where it is desired that the nut shall have the locking features and be removable at times, that the extremity of the tongue on its face side shall be rounded to permit the backing off of the nut without injury to the binding surfaces.

I attain the above objects by the novel construction of my improved nut, and other objects and advantages of the invention will appear in the subjoined description of the accompanying sheet of drawings, in which.

Figure 1:
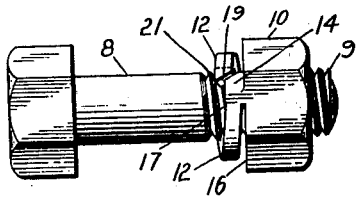
Figure 1 is a side view of the nut screwed on a bolt.

Adverting to the drawings and figures thereof: The numeral 8 represents a common bolt having the customary threads 9, and upon which threaded bolt is mounted my invention which comprises a perforated block 10, hexagonal in shape in this instance, having threads 11 complementary to the bolt, and upon the face side of the block or nut is formed as a homogeneous integral part thereof the lock washer of my device, which in service performs the functions of the present jam nut, two or more piece lock nut, or separate lock washer interposed between the work and the common nut.

As illustrated in the present case, the lock washer of my device consists of a pair of similar tongues 12 projecting axially from the face of the nut, and preferably spirally formed as shown throughout the figures. 14 indicates the projecting root of the tongue and 15 the face side of the said root, and which face side 15 of each root lies in the same plane and parallel with the face plane 16 of the nut, and consequently the same is at right angles to the axis of the nut and also to the bolt.

Fig. 1 shows to advantage the root as a solid continuation of the nut, and at 17 the tongue spirally projects from the root in the direction of the axis of the nut from the parallel face 15 of the root.

Figure 3:
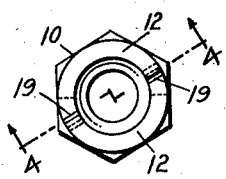
Fig. 3 is a face view of the nut of Fig. 1.
Figure 2:
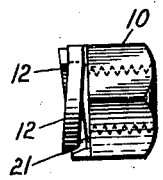
Fig. 2 is a view of the nut turned through an angle of 90 degrees.
Figure 4:
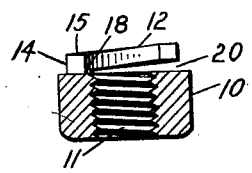
Fig. 4 is a vertical section through the nut on the line 4—4 of Fig. 3.
Figure 6:
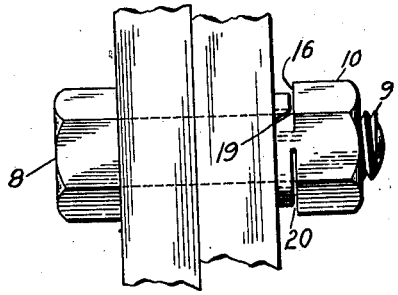
Fig. 6 is a view of the bolt and nut of Fig. 1 in service.
Figure 5:
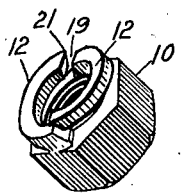
Fig. 5 is a perspective view of the nut from the face side.

From the figures and especially Fig. 3, it will be noted that the tongues lie within the confines of the longitudinal surfaces of the nut, hence, no interference is encountered in the application and tightening of the nut to the work. The tongues form a collar adapted to surround the bolt but not to touch the same, as a clearance is provided for the purpose and best shown at 18, Fig. 4.

The root of each tongue is separated from the end of the adjacent tongue by a kerf 19 and the tongues are separated from the nut by kerfs 20, and the tips of the tongues at their outside faces are preferably angular as shown at 21, Fig. 1.

The nut is made of a chosen quality of steel, the tongues formed and the same tempered uniformly to a degree for suitable elasticity and resiliency.

In practice, the nut is tightened on the work such that the plurality of tongue tips may do the binding and holding in some cases, or the tightening may be continued until the faces 15 of the roots contact the work, and at which time the whole face of the lock washer is in contacting engagement.

Figure 7:
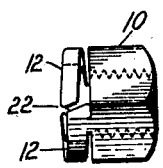
Fig. 7 shows a modification of the nut.

In Fig. 7 I show a modification of my nut insomuch that the tips of the tongues at the outside faces are rounded as at 22, to permit occasional removal of the nut when desired for certain classes of work. The said tips being rounded prevent gouging or other injury to the work and may be used over and over again.

For aeroplane, automobile and other vibratory work the use of the nuts having the sharp cornered tongues are preferred, as generally they are for permanent application.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claim.

Having thus described my invention, what I claim as new and desire to secure by Letters Patent of the United States, is the following:

A nut having a lock washer formed on its face, said lock washer comprising a plurality of resilient, spirally formed tongues, each tongue projecting axially from a root integral with the nut, each root being provided with a face side parallel with the face of the nut and at right angles to the axis of the nut, the face sides of the roots being in the same plane; each tongue being separated from the nut by one kerf, and the root of each tongue being separated from the end of the adjacent tongue by another kerf and the edge of each tongue first engaging the work being rounded to facilitate removal of the nut.

In testimony whereof I affix my signature.

DAVID E. WILLIAMS.